US009842519B2

(12) United States Patent
Burout et al.

(10) Patent No.: US 9,842,519 B2
(45) Date of Patent: Dec. 12, 2017

(54) FASTENER ASSEMBLY AND SYSTEM FOR MANUFACTURING THE SAME

(75) Inventors: Charles Burout, Bedford, NH (US); Thomas Shilale, Douglas, MA (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 13/102,552

(22) Filed: May 6, 2011

(65) Prior Publication Data

US 2012/0279100 A1 Nov. 8, 2012

(51) Int. Cl.
*G09F 3/12* (2006.01)
*B29C 47/00* (2006.01)
*B29C 47/02* (2006.01)

(52) U.S. Cl.
CPC ............ *G09F 3/12* (2013.01); *B29C 47/0014* (2013.01); *B29C 47/0066* (2013.01); *B29C 47/025* (2013.01)

(58) Field of Classification Search
CPC ... G09F 3/12; B29C 47/0014; B29C 47/0066; B29C 47/025
USPC ......................................... 40/662; 340/572.8
See application file for complete search history.

(56) References Cited

U.S. PATENT DOCUMENTS

| | | | |
|---|---|---|---|
| 3,421,241 A * | 1/1969 | Hochberg | 40/124.191 |
| 4,462,784 A | 7/1984 | Russell | |
| 4,888,896 A * | 12/1989 | Sanchez | 40/630 |
| 4,955,475 A | 9/1990 | McCarthy | |
| 5,949,336 A * | 9/1999 | Deschenes et al. | 340/572.8 |
| 6,025,781 A * | 2/2000 | Deschenes | 340/572.8 |
| 2004/0205940 A1* | 10/2004 | Cooper et al. | 24/16 PB |

(Continued)

FOREIGN PATENT DOCUMENTS

| | | |
|---|---|---|
| CN | 1045563 A | 9/1990 |
| CN | 2791786 | 6/2006 |

(Continued)

OTHER PUBLICATIONS

International Search Report dated Jul. 23, 2012 from International Application No. PCT/US2012/035929 filed May 1, 2012.

(Continued)

*Primary Examiner* — Syed A Islam
(74) *Attorney, Agent, or Firm* — Avery Dennison Corporation

(57) ABSTRACT

A fastener assembly includes a molded plastic fastener shaped to define a filament, a paddle at one end of the filament, and a cross-bar at the other end of the filament. The fastener assembly additionally includes a printed label embedded in the paddle, the printed label including an electrically chargeable, stiffness enhancing laminate that is applied to a print receptive polymer substrate. An in-line system for manufacturing a continuously connected supply of the fastener assemblies includes a rotatable mold wheel, a feed mechanism for advancing a continuous, ionized, printed polymer web in a near tangential relationship relative to the mold wheel periphery, a cutting mechanism for transversely cutting through the web to form a plurality of rectangular printed labels that are magnetically drawn into corresponding cavities in the mold wheel, an extruder for applying molten plastic into the cavities and a knife for skiving excess hardened plastic from the mold wheel periphery.

11 Claims, 5 Drawing Sheets

(56) References Cited

U.S. PATENT DOCUMENTS

2004/0227267 A1* 11/2004 Williams et al. ............. 264/132
2008/0308637 A1   12/2008 Okeefe
2011/0041370 A1*   2/2011 Saint ....................... G09F 3/005
                                                              40/633

FOREIGN PATENT DOCUMENTS

| CN | 2791786 Y     | 6/2006  |
|----|---------------|---------|
| CN | 101039800 A   | 9/2008  |
| CN | 201111290 Y   | 9/2008  |
| EP | 0387883 A     | 9/1990  |
| GB | 1381862       | 1/1975  |
| WO | 2003/013843   | 2/2003  |
| WO | 2008/143868   | 11/2008 |

OTHER PUBLICATIONS

Written Opinion dated Jul. 23, 2012 from International Application No. PCT/US2012/035929 filed May 1, 2012.
State Intellectual Property Office of the Peoples Republic of China First Office Action and Search Report dated May 27, 2015. (Original and English Translation).

* cited by examiner

FASTENER ASSEMBLY AND SYSTEM FOR MANUFACTURING THE SAME

CROSS-REFERENCE TO RELATED APPLICATION(S)

None.

FIELD OF THE INVENTION

The present invention is in the field of devices used for branding, advertising, marketing and providing information to consumer goods.

BACKGROUND OF THE INVENTION

The present invention relates generally to plastic fasteners of the type used to attach merchandise tags to pieces of fabric.

Plastic fasteners of the type used to attach merchandise tags to pieces of fabric, such as articles of clothing, product labels, and the like, are well known in the art and widely used in the retail industry. Typically, such fasteners comprise an elongated plastic member having a first end shaped to define a cross-bar (also commonly referred to as a "T-bar"), a second end shaped to define a paddle, and a thin filament portion interconnecting the cross-bar and the paddle. As will be described further below, the cross-bar is adapted to be inserted first through a tag and then into a desired piece of fabric, with the paddle being appropriately sized and shaped to keep the tag from being pulled off the second end of the filament portion.

Plastic fasteners of the type described above are typically mass-produced in either one of two different forms known as fastener stock. A first type of fastener stock is a clip-type assembly, said clip comprising a plurality of fasteners, each such fastener comprising a flexible filament having a cross-bar at one end thereof and a paddle at the opposite end thereof. The fasteners are arranged in a spaced, front-to-back orientation, with the respective cross-bars parallel to one another and the respective paddles parallel to one another, each of the cross-bars being joined to a common, orthogonally-disposed runner bar by a severable connector. Adjacent paddles also may be interconnected by severable connectors extending therebetween.

The aforementioned fastener clip is typically made through the process of injection molding. Several commercial embodiments of the above-described fastener clip have been sold by the present assignee, Avery Dennison Corporation, as DENNISON® SWIFTACH® fastener clips.

A second type of fastener stock is shown in U.S. Pat. No. 4,955,475, which issued on Sep. 11, 1990 in the names of Francis T. McCarthy et al., the disclosure of which is incorporated herein by reference. This type of fastener stock comprises a plurality of fasteners arranged in a side-by-side, co-planar arrangement, the paddles and T-bars of successive fasteners being joined together by severable connectors so as to form a supply of continuously connected fastener stock.

The second type of fastener stock is commonly manufactured through a process which is referred to in the art as continuous molding. An example of an apparatus designed to manufacture continuously connected fastener stock using a continuous molding process is disclosed in U.S. Pat. No. 4,462,784, inventor David B. Russell, issued Jul. 31, 1984 (which patent is incorporated herein by reference). In the patent, continuously connected fastener stock is produced using a rotating mold wheel that includes cavities in its periphery that correspond in shape to the molded fastener stock. To form the fastener stock, molten plastic is extruded into the cavities of the rotating mold wheel with a layer of controlled film overlying the peripheral impression. The molten plastic is then allowed to solidify. A knife in substantially elliptical contact with the peripheral impression is then used to skive excess plastic from the rotating mold wheel (i.e., the layer of controlled film), leaving plastic only in the molding cavities. After the skiving process, the continuously connected fastener stock is removed, in-line, from the cavities in the molding wheel. Transfer rolls advance the fastener stock typically to a stretching station where selected portions of the fastener stock are selectively distended (e.g., using diverging sprocket wheels). After the stretching process, the fastener stock is collected onto a windup roll for packaging.

It is known in the art to mark, or brand, the enlarged paddle of plastic fasteners of the type described above with identifying information relating to the product to which the fastener is ultimately to be attached. Examples of product identifiers include, inter alia, a company name, a product name, a logo, a unique alphanumeric character string and/or a product barcode. As can be appreciated, branding the enlarged paddle of plastic fasteners with identifying information serves to, among other things, improve brand recognition, enhance marketability and deter ticket-switching (i.e., prevent unscrupulous consumers from severing an unmarked plastic fastener, removing the severed plastic fastener and accompanying merchandise tag from the product, and then securing a less expensive merchandise tag onto the product using another unmarked, similarly constructed plastic fastener).

In U.S. Patent Application Publication No. 2004/0205940, which published on Oct. 21, 2004 in the names of William J. Cooper et al., there are disclosed various methods for marking the enlarged paddles of a strip of plastic fasteners produced through continuous molding, the publication being incorporated herein by reference.

In one embodiment of the '940 publication, a high-speed in-line label applicator affixes an adhesive-backed paper label onto an exposed face of each enlarged paddle as the continuous strip of fasteners is transported away from the rotating mold wheel. For at least the reasons set forth below, the in-line application of paper-based labels onto each paddle of the continuous strip of fasteners introduces a number of notable shortcomings.

As a first shortcoming, it has been found that the use of a pressure-sensitive adhesive to apply a paper-based label onto the paddle of a corresponding plastic fastener is not adequately secure. Specifically, the relatively weak adhesive bond enables the paper label to be readily peeled off its corresponding fastener. As a result, plastic fasteners with paper-labels adhesively bonded thereto are highly susceptible to tampering.

As a second shortcoming, it has been found to be difficult to integrate the in-line label applicator into the continuous molding process in an efficient manner. In particular, the precision and timing that is required between the label applicator and in-line transfer of the strip of fasteners away from the continuous mold wheel is considered too difficult to implement in a high-speed environment, thereby limiting product output.

As a third shortcoming, the aforementioned process is only capable of producing plastic fasteners with identifying information on one side of its enlarged paddle. As a result, the opposite face of the enlarged paddle is rendered unused for identification purposes.

In another embodiment of the '940 publication, the mold wheel cavities are designed to produce a continuous strip of fasteners with paddles that are either cut-out, embossed and/or debossed with identifying information.

As can be appreciated, engraving or otherwise modifying the individual mold wheel cavities to produce fastener paddles shaped to include identifying information requires that a unique rotatable mold wheel be constructed for each paddle design. As a result, the aforementioned process is both costly to implement and unable to support any rapid, on-the-fly modification (i.e., customization) of the information displayed on the fastener paddles.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

It is an object of the present invention to provide a new and improved fastener of the type used to attach a tag to a product.

It is another object of the present invention to provide a fastener of the type described above which preferably can be mass-produced as a continuously connected supply of fastener stock, each fastener comprising a thin filament portion that interconnects an enlarged paddle with a cross-bar.

It is yet another object of the present invention to provide a fastener of the type described above that displays identifying information in the fastener paddle in order to, inter alia, improve brand recognition, enhance marketability and deter ticket-switching.

It is still another object of the present invention to provide a fastener of the type described above that displays the identifying information in a secure, tamper-resistant fashion.

It is yet still another object of the present invention to provide a novel system for manufacturing a continuous supply of fasteners of the type as described above.

It is another object of the present invention to provide a fastener manufacturing system of the type described above that allows for customized modification of the identifying information provided in each paddle in a rapid and inexpensive manner. It is yet another object of the present invention to provide a fastener manufacturing system as described above which has a limited number of parts, which is inexpensive to implement, which is efficient and reliable in its operation and which is easy to use.

Accordingly, as one feature of the present invention, there is provided fastener assembly comprising (a) a plastic fastener comprising (i) a filament, (ii) a paddle at one end of said filament, the paddle having a top surface and a bottom surface, and (iii) a cross-bar at the other end of the filament, and (b) a label at least partially embedded into the top surface of the paddle, the label comprising, (i) a print receptive substrate having a top surface and a bottom surface, and (ii) an electrically chargeable, stiffness enhancing laminate applied to the top surface of the semi-rigid substrate.

As another feature of the present invention, there is provided a system for manufacturing one or more fastener assemblies, each fastener assembly comprising a fastener and a label at least partially embedded in the fastener, each fastener comprising a filament, a paddle at one end of the filament, and a cross-bar at the other end of the filament, the system comprising (a) a rotatable mold wheel having cavities in a peripheral surface thereof, (b) a label depositing device for depositing electrically charged labels into selective cavities in the rotatable mold wheel, (c) an extruder for applying molten plastic material into the cavities in the rotatable mold wheel such that a layer of controlled film overlies the cavities, and (d) a knife for skiving the layer of controlled film overlying the cavities.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to FIGURES.

Fastener Assembly 11

Figure 1A:
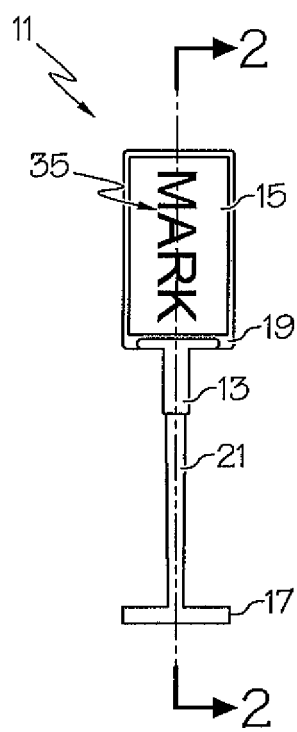
FIGS. 1(a) and 1(b) are front and side views, respectively, of a fastener assembly constructed according to the teachings of the present invention.
Figure 1B:
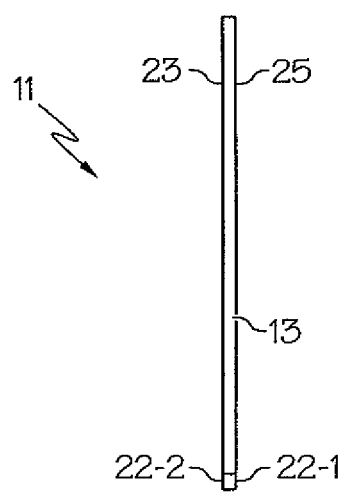
Figure 2:
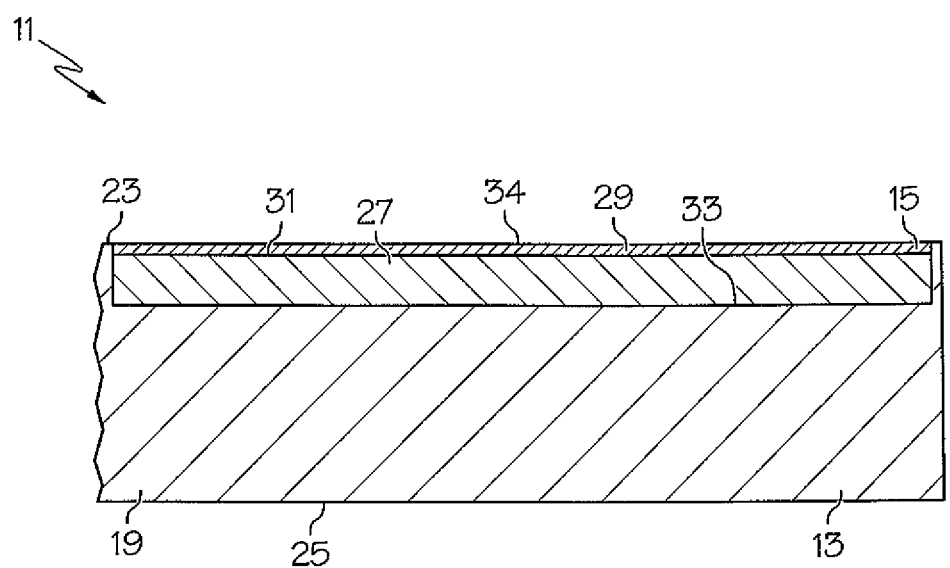
FIG. 2 is an enlarged, fragmentary section view of the fastener assembly shown in FIG. 1(a), taken along lines 2-2.

Referring now to FIGS. 1(a), 1(b) and 2, there are shown top, side and enlarged section views of a fastener assembly constructed according to the teachings of the present invention, the fastener assembly being identified generally by reference numeral 11. As will be described further below, fastener assembly 11 can be used to (i) attach a merchandise tag, or ticket, to a piece of fabric and (ii) display identifying information in a secure and tamper-resistant manner.

Fastener assembly 11 comprises a plastic fastener 13 and an in-mold label 15 at least partially embedded within fastener 13.

Fastener 13 is an elongated unitary member with an overall length in the range of approximately 1.25-2.05 inches (prior to stretching) and is molded using a suitable plastic material, such as polypropylene, nylon, polyethylene terephthalate (PET), polyurethane, recyclable plastics, bio-based plastics, and biodegradable plastics such as polylactic acid (PLA), polyhyrdoxyalkanoates (PHA), polyhydroxy-butyrate (PHB), and polyvinyl acetate (PVA) materials, or a combination thereof. Plastic fastener 13 is shaped to define a cross-bar, or T-bar 17, at one end, an enlarged paddle 19 at its other end, and a thin filament 21 that interconnects cross-bar 17 to paddle 19.

Cross-bar 17 is generally D-shaped in lateral cross-section and includes a flat bottom surface 22-1 and a rounded top surface 22-2. As such, cross-bar 17 is appropriately sized and shaped to be inserted through a tag and into a piece of fabric, preferably through the hollow slotted needle of a conventional tagger gun (e.g., of the type disclosed in U.S. Pat. No. 4,955,475).

Paddle 19 is in the form of a flattened rectangular member that is approximately 0.75 inches in length, approximately 0.35 inches in width and approximately 0.03 inches in thickness. As such, it is to be understood that paddle 19 is appropriately sized and shaped to prevent a merchandise tag which is slidably mounted on filament 21 from being removed thereover. As seen most clearly in FIG. 2, paddle 19 includes a substantially flat top surface 23 and a substantially flat bottom surface 25.

Label 15 is represented herein as being in the form of a thin rectangular film, but is not limited to this shape, that has a length and width that is slightly less than the corresponding length and width of each face of paddle 19 and that has an overall thickness in the range of approximately 0.001-0.015 inches. As seen most clearly in FIG. 2, label 15 comprises a semi-rigid substrate 27 and a laminate 29. The label material may also be comprised of only a single semi-rigid substrate.

Semi-rigid substrate 27 is preferably in the form of a semi-rigid polymeric film, such as a bi-axially oriented polypropylene (BOPP) film, and includes a substantially flat top surface 31 and a substantially flat bottom surface 33. As can be appreciated, the semi-rigid nature of substrate ensures that the structural integrity of label 15 is preserved during the in-molding process, as will be described further below. In addition, the utilization of a semi-rigid polymeric film enables bottom surface 33 of semi-rigid substrate 27 to form a quality bond with plastic paddle 19 during the in-molding process, thereby minimizing the risk of label tampering, which is a principal object of the present invention.

Laminate 29 is applied to top surface 31 and is preferably formed using a clear and smooth material that is electrically chargeable, stiffness enhancing and abrasion resistant. Laminate 29 includes an exposed outer surface 34 that lies generally flush with top surface 23 of paddle 19. As will be described further in detail below, the electrically chargeable, stiffness enhancing nature of laminate 29 can be used to retain label 15 fixed in place within a corresponding mold wheel cavity during the in-molding process, which highly desirable.

It should be noted that label 15 is not limited to the particular construction set forth in detail above. Rather, it is to be understood that additional items or layers could be incorporated into label 15 without departing from the spirit of the present invention. For example, one or more inlays (e.g., a security inlay and/or an RFID inlay) or electronic components (e.g., an integrated circuit (IC)) could be integrated into label 15 to enhance the functionality of fastener assembly 11 (e.g., provide fastener assembly 11 with electronic article surveillance (EAS) and/or radio frequency identification (RFID) capabilities).

Referring back to FIG. 1, identifying information, or identifier 35, is preferably printed onto semi-rigid substrate 27 of label 15 prior to the in-molding process. Identifier 35 is represented herein as being in the form of the word "MARK." However, it is to be understood that identifier 35 is not limited to the word "MARK." Rather, identifier 35 is meant to represent any conceivable marking which identifies a particular product or source thereof without departing from the spirit of the present invention. Examples of some potential product identifiers 35 include, inter alia, a company name, a product name, a logo, a unique sequential character string, size and/or color-for-size information relating to an article of clothing, product specification data and/or a product barcode.

As can be appreciated, the visibility of label 15 in fastener 13 provides fastener assembly 11 with notable advantages over conventional fasteners which do not include a label or other similar identification means.

As a first advantage, displaying label 15 in fastener 13 can be used to further authenticate the source of the article to which fastener assembly 11 is attached, thereby deterring counterfeiting, which is highly desirable.

As a second advantage, displaying label 15 in fastener 13 can be used to increase the recognition of the manufacturer name, product name, and/or company logo present thereon, thereby increasing product marketability, which is highly desirable.

As a third advantage, displaying label 15 in fastener 13 can be used to identify and authenticate fastener assembly 11, thereby serving as greater deterrent against the act of ticket-switching, which is highly desirable.

Fastener assembly 11 may be molded as part of a quantity of either continuously connected fastener stock or fastener stock of the type having an orthogonally disposed runner bar.

Figure 3:
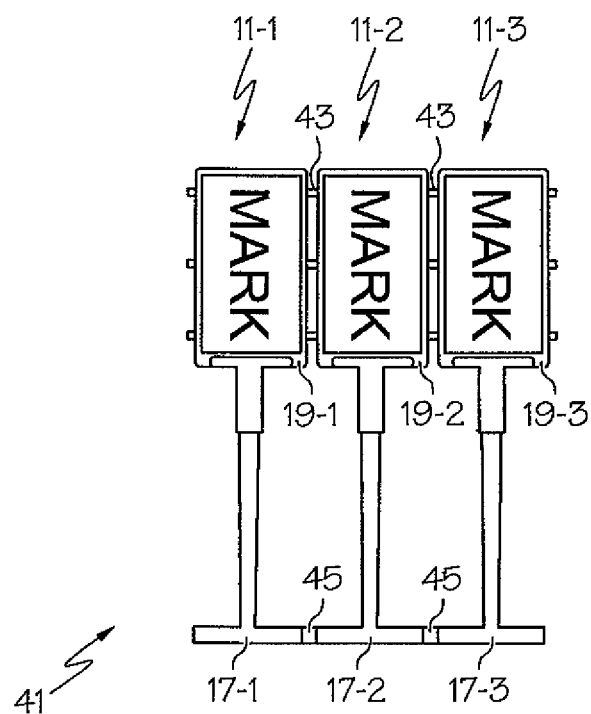
FIG. 3 is a fragmentary top view of a plurality of the fastener assemblies shown in FIG. 1, the fastener assemblies being interconnected to form a quantity of continuously connected fastener stock constructed according to the teachings of the present invention.

Fastener assembly 11 is preferably molded as part of a quantity of continuously connected fastener stock 41 which is shown in detail in FIG. 3, the pitch of fastener assembly 11 (i.e., the spacing between successive filaments 21) being preferably approximately 0.37 inches. As can be seen, fastener stock 41 comprises a plurality of individual fastener assemblies 11-1 thru 11-3 which are arranged in a co-planar, side-by-side arrangement. Co-planar paddles 19-1 thru 19-3 of adjacent fastener assemblies 11 are joined together by one or more spaced apart severable connectors 43. Similarly, co-axial T-bars 17-1 thru 17-3 of adjacent fastener assemblies 11 are joined together by a severable connector 45. In this manner, the plurality of fastener assemblies 11 are joined together to form the continuously connected fastener stock 41.

System 51 for Continuously Molding Fastener Stock 41

Figure 4:
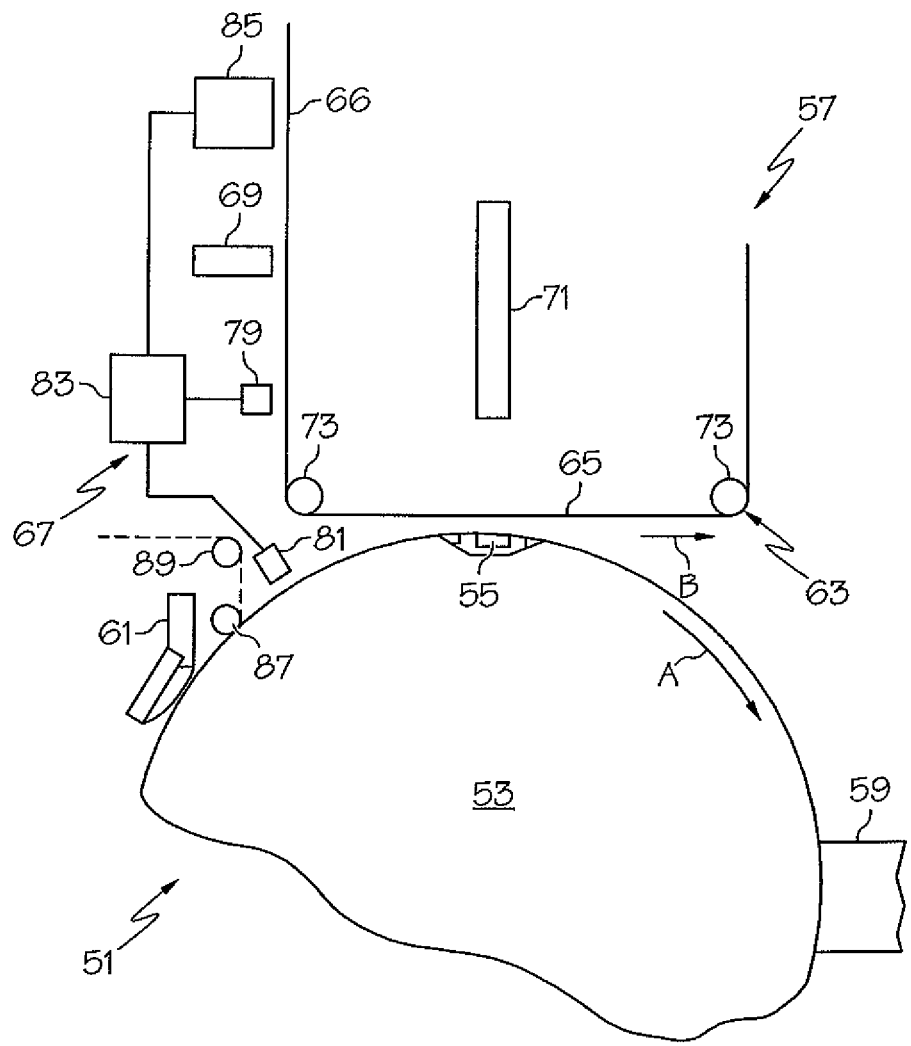
FIG. 4 is fragmentary, schematic representation, broken away in part, of a system for constructing the quantity of continuously connected fastener stock shown in FIG. 3, the system being constructed according to the teachings of the present invention.

Referring now to FIG. 4, fastener stock 41 is preferably manufactured by a continuous molding system that is constructed according to the teachings of the present invention, the continuous molding system being identified generally by reference numeral 51. As will be described in detail below, system 51 operates both efficiently and reliably to produce a continuous supply of fastener stock 41 in a productive and cost-effective manner.

System 51 comprises a rotatable mold wheel 53 with cavities 55 in a peripheral surface thereof, a label dispensing apparatus 57 for depositing statically charged labels 15 into selective cavities 55 in mold wheel 53, an extruder 59 for applying molten plastic material into cavities 55 in mold wheel 53 such that a layer of controlled film overlies cavities 55, and a knife 61 for skiving the layer of controlled film overlying cavities 55 to yield the continuous supply of fastener stock 41.

Mold wheel 53 is constructed of a rigid and durable metallic material, such as steel, and is rotatably driven in the clockwise direction (as represented by arrow A in FIG. 4) by a motor (not shown). The periphery of mold wheel 53 includes cavities 55 that correspond in shape to fasteners 13 in continuously connected fastener stock 41. For reasons to become apparent below, mold wheel 53 is preferably grounded and thereby holds a neutral charge.

As noted briefly above, label dispensing apparatus 57 is designed to deposit statically charged labels 15 into selective cavities of rotating mold wheel 53 immediately prior to the extrusion process. In this manner, each in-mold label 15 becomes at least partially embedded in fastener 13 as the extruded plastic cools and hardens. It is to be understood that the particular design of label dispensing apparatus 57 and its integration within the continuous molding process serves as a principal novel feature of the present invention.

Label dispensing apparatus 57 comprises a feed mechanism 63 for advancing a continuous polymer web 65 in close proximity to the periphery of mold wheel 53, a timing, or adjustment, mechanism 67 for acutely synchronizing feed mechanism 63 with mold wheel 53, an ionization device 69 for statically charging web 65 and a cutting mechanism 71 for separating individual labels 15 from web 65 in such a manner so that each label 15 is deposited into a corresponding cavity 55 in mold wheel 53 immediately prior to the extrusion process.

Feed mechanism 63 is represented herein as being in the form of a pair of spaced apart motor-driven feed wheels 73 that are positioned to advance continuous polymer web 65 in a close, near tangential relationship relative to the periphery of mold wheel 53 (as represented by arrow B in FIG. 2). Specifically, feed mechanism 63 passes polymer web 65 approximately 0.005 to 0.060 inches away from the periphery of mold wheel 53.

Figure 5:
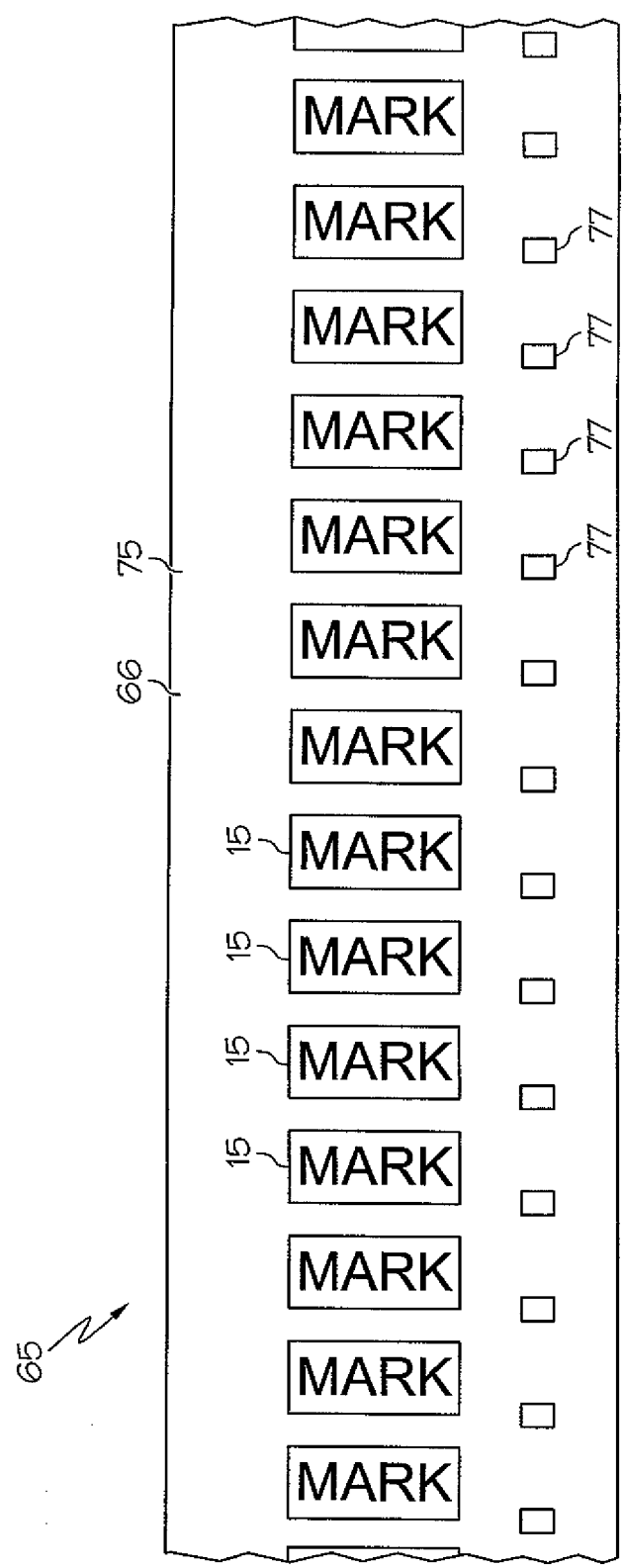
FIG. 5 is a top view of a continuous polymer web that is printed to define a linear array of labels of the type shown in FIG. 2.

As seen most clearly in FIG. 5, continuous polymer web 65 is preferably in the form of a strip of plastic film that has the same general cross-sectional construction as each label 15 (i.e., an electrically chargeable, stiffness enhancing laminate applied onto a print receptive polymeric substrate). Web 65 includes a top surface 66 that is printed to define a linear array of labels 15 arranged top-to-bottom in a spaced apart relationship and a connective matrix 75. In addition, a series of registration marks 77, each in the form of a blackened square, is printed on top surface 66 of connective matrix 75 in direct alignment with a corresponding label 15, the function of registration marks 77 to become apparent below.

Adjustment mechanism 67 is designed to adjust the speed of the motor (not shown) for feed mechanism 63 to the extent necessary so that each label 15 in web 65 precisely aligns with a corresponding cavity 55 in mold wheel 53. Adjustment mechanism 67 comprises a web sensor 79 that is positioned to detect registration marks 77 in web 65, a mold wheel sensor 81 that is positioned to detect individual cavities 55 (or corresponding markings) in mold wheel 53 and a compute device 83 electronically linked with sensors 79 and 81. In this capacity, compute device 83 (i) monitors the alignment of labels 15 in web 65 with corresponding cavities 55 in mold wheel 53 and, if necessary, (ii) adjusts the timing of feed mechanism 63 to ensure that alignment remains proper at all times.

Ionization device 69 is preferably in the form of a ion generator that is designed to spray top surface 66 of web 65 with negative or positive ions. As will be described further below, the ionization of web 65 serves to magnetically draw labels 15 separated from web 65 firmly within corresponding cavities 55 in mold wheel 53.

Cutting mechanism 71 is designed to transversely cut out each label 15 from web 65 when said label 15 is disposed directly above (and in close relationship to) its corresponding cavity 55 in mold wheel 53. The remainder, or waste, of web 65 (namely, matrix 75) is then transferred away from mold wheel 53 for discarding or recycling.

As a feature of the present invention, it should be noted that the electrostatic energy applied to web 65 allows it to become attracted to the grounded mold wheel 53. As a result, once cutting mechanism 71 separates label 15 from web 65, wheel 53 magnetically draws label 15 into its corresponding cavity 55. Label 15 is then retained taut and firmly disposed in its cavity 55 during the extrusion process, which ensures label 15 is properly oriented within paddle 19 as the extruded plastic is applied and hardens, which is highly desirable.

It should be noted that a printer 85, such as a digital or ink-jet printer, is represented herein as being positioned in-line immediately prior to the ionization process, printer 85 being electrically connected to compute device 83. In this capacity, it is to be understood that printer 85 can be used to print, on-the-fly, at least a portion of the variable identifying information provided on top surface 66 of web 65. As a result, enhanced customization of fastener assembly 11 is readily obtainable, which is highly desirable. However, it is to be understood that the process of printing identifying information on web 65 could be alternatively undertaken prior to loading web 65 on feed mechanism 63 (i.e., at a separate location, such as a print center).

In use, system 51 functions in the following manner to produce a continuous supply of fastener stock 41. Specifically, as noted above, as mold wheel 53 rotates in the clockwise direction, as represented by arrow A in FIG. 4, feed mechanism 63 advances web 65 at the same speed in a near tangential relationship to mold wheel 53, as represented by arrow B in FIG. 4. To ensure that each label 15 on web 65 directly aligns with a corresponding cavity 55 in mold wheel 53, timing mechanism 67 monitors the relative locations of web 65 and mold wheel 53 and adjusts motor-driven feed mechanism 63 when needed. After top surface 66 of web 65 is printed and statically charged, cutting mechanism 71 separates an ionized label 15 from web 65, with static energy magnetically drawing separated label 15 into its corresponding cavity 55 in mold wheel 53.

With label 15 retained taut and firmly disposed within its designated cavity 55, extruder 59, which is disposed in a tangential relationship relative to mold wheel 53 at a location after the label depositing process, applies molten plastic into cavities 55 with a layer of controlled film overlying the peripheral impression of wheel 53. As noted above, the magnetic draw between label 15 and mold wheel 53 holds label 15 in place as the molten plastic is applied, which is highly desirable.

As mold wheel 53 continuous to rotate in the clockwise direction, the extruded molten plastic solidifies around label 15. As a result, label 15 is at least partially embedded, or in-molded, within the solidified plastic. Once the molten plastic fully hardens, skiving knife 61, which is in substantially elliptical contact with the peripheral surface of wheel 53 at a location after extruder 59, is then used to skive excess plastic from rotating wheel 53, thereby leaving plastic only within cavities 55. After the skiving process, a take-off roll 87 preferably removes the continuously connected fastener stock 41 from rotating mold wheel 53. The fastener stock 41 is then preferably advanced, in-line, by one or more transfer rolls 89 to a device for stretching each fastener filament 21 a predefined length (not shown) and a device for winding fastener stock 41 into a roll suitable for storage and transport (not shown).

It will thus be seen according to the present invention a highly advantageous fastener has been provided. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

What is claimed is:

1. A fastener assembly comprising: (a) a plastic fastener comprising, (i) a filament, (ii) a paddle at one end of said filament, the paddle having a top surface and a bottom surface, and (iii) a cross-bar at the other end of the filament, and (b) a label at least partially embedded into the top surface of the paddle and bonded to the bottom of the paddle by plastic of the paddle, the label comprising, (i) a print receptive, semi-rigid polymeric film having a top surface and a bottom surface, and (ii) having variable identifying information printed on the fly onto the substrate of the label for enhanced customization of the fastener; (iii) an electrically chargeable, stiffness enhancing, abrasion resistant laminate applied to the top surface of a semi-rigid bi-axially oriented polypropylene substrate, and the laminate includes an exposed outer surface that lies generally flush with the top surface of the paddle; wherein the electrically chargeable, stiffness enhancing, abrasion resistant laminate allows the label to be fixed in position within a corresponding mold wheel cavity during an in-molding process.

2. The fastener assembly of claim 1 wherein the paddle has a thickness in the range of approximately 0.020-0.035 inches.

3. The fastener assembly of claim 2 wherein the label has a thickness in the range of approximately 0.001-0.015 inches.

4. The fastener assembly of claim 1, wherein the label includes a RFID inlay.

5. The fastener assembly of claim 1, wherein identifying information is printed onto the laminate.

6. The fastener assembly of claim 5, wherein the identifying information is a company name, product name, logo, unique sequential character string, and/or size and/or color-for-size information.

7. The fastener assembly of claim 1, wherein the assembly is molded as part of a quantity of continuously connected fastener stock or fastener stock having an orthogonally disposed running bar.

8. The fastener assembly of claim 7, wherein a pitch of the assembly is approximately 0.37 inches.

9. The fastener assembly of claim 1, wherein the fastener is molded using polypropylene, nylon, PET, polyurethane, recyclable plastics, bio-based plastics, and biodegradable plastics, PHA, PHB, and PVA materials, or a combination of both.

10. The fastener assembly of claim 1, wherein the label is rectangular.

11. A fastener assembly comprising: (a) a plastic fastener comprising, (i) a filament, (ii) a paddle at one end of said filament, the paddle having a top surface and a bottom surface such that both the top and bottom surface can be used for identification purposes, and (iii) a cross-bar at the other end of the filament, and (b) a label that includes a RFID inlay at least partially embedded into the top surface of the paddle and bonded to the bottom of the paddle by plastic of the paddle, the label comprising, (i) a print receptive, semi-rigid substrate having a top surface and a bottom surface, and (ii) having variable identifying information printed on the fly onto the substrate of the label for enhanced customization of the fastener, and (iii) an electrically chargeable, stiffness enhancing, abrasion resistant laminate applied to the top surface of the semi-rigid substrate, and the laminate includes an exposed outer surface that lies generally flush with the top surface of the paddle.

* * * * *